United States Patent [19]

Tunze

[11] 4,311,588
[45] Jan. 19, 1982

[54] FILTER FOR USE WITH AN AQUARIUM

[76] Inventor: Norbert Tunze, Wankstr. 39, 8122 Penzberg, Fed. Rep. of Germany

[21] Appl. No.: 113,727

[22] Filed: Jan. 21, 1980

[51] Int. Cl.³ .............................................. E04H 3/20
[52] U.S. Cl. ................................... 210/169; 210/335; 210/416.2
[58] Field of Search ............... 210/169, DIG. 17, 335, 210/437, 443, 444, 416 AS; 119/3, 5; 137/112

[56] References Cited

U.S. PATENT DOCUMENTS

| | | | |
|---|---|---|---|
| 3,224,585 | 12/1965 | Scavuzzo et al. | 210/DIG. 17 |
| 3,557,958 | 1/1971 | Baldwin | 210/443 |
| 3,567,023 | 3/1971 | Buckman et al. | 210/DIG. 17 |
| 3,610,416 | 10/1971 | Otto | 210/169 |
| 3,719,281 | 3/1973 | Dieringer | 210/DIG. 17 |
| 3,768,659 | 10/1973 | Miller | 210/444 |
| 3,859,216 | 1/1975 | Sisson et al. | 210/DIG. 17 |
| 3,935,106 | 1/1976 | Lipner | 210/444 |
| 3,945,923 | 3/1976 | Rogers | 210/444 |
| 3,982,520 | 9/1976 | Wheeler | 210/444 |
| 3,988,787 | 11/1976 | Colee | 137/112 |
| 4,036,756 | 7/1977 | Dockery | 210/169 |
| 4,082,673 | 4/1978 | Cilento | 210/444 |
| 4,093,547 | 6/1978 | Sherman et al. | 210/169 |

OTHER PUBLICATIONS

"Das Korallenaquarium," 1965, p. 13, Von Jurgen Grobe, Alfred Kernen Verlag Stuttgart.

*Primary Examiner*—Theodore A. Granger
*Attorney, Agent, or Firm*—Fred Philpitt

[57] ABSTRACT

A filter for use with an aquarium is provided which is in direct fluid communication with the water of the aquarium, Only mechanical plug and socket type connections are used to connect the filter housing to a submersible centrifugal pump and to connect a closure member of the filter housing to a housing main body. No separate seal means are used. Inlet connecting means as well as outer connecting means of the filter housing are both provided in the closure member. Support means are provided to support the filter housing in such vertical position that the joint between the closure member and the housing main body of the filter housing just immerges into the water of the aquarium. Thus, the major portion of the filter housings projects above the surface of the water of the aquarium leaving a maximum of water volume accessible to fish and providing a field of view of maximum size. Thus, an extremely attractive, fail-safe and low cost filter is provided.

16 Claims, 5 Drawing Figures

FILTER FOR USE WITH AN AQUARIUM

DESCRIPTION

The present invention relates to a filter for use with an aquarium comprising a filter housing adapted to receive filter material, having inlet connector means communicating with the water of the aquarium and outlet connector means connectable to the suction side of a submersible pump, both connector means submerging into the water of the aquarium, and including a main body and a closure member removably carried thereby, and comprising support means to support the filter housing from the aquarium.

Such filters have been commercialized by applicant for more than 20 years.

Normally the water of an aquarium is circulated through a filter for cleaning purposes using a centrifugal pump. In view of a pleasant appearance of the aquarium it is desirable to completely keep the aquarium clear from components of the filter system and to arrange the filter system within a cabinet supporting the aquarium. This requires that separate hose connections be provided and that the filter as well as the pump are hermetically sealed. Such filter systems are quite expensive. Furthermore, if a failure of the hose connections occurs or if the filter or the pump leaks considerable damage is encountered. In addition, often there is no space available to house a remote filter system.

Filter systems including a filter arranged within the aquarium and a submersible centrifugal pump as already referred to above are of small cost and there is no danger of water escaping from the filter circuit. In such filter system a gas tight sealing of the suction side of the filter and the pump also presents no difficulties. Thus, self-suction capability of the pump is obtained without taking special precautions. The centrifugal pump proper speaking and the filter housing arranged therebelow as well as the intermediate mechanical connections are arranged within the water volume so that no air can penetrate into the filter circuit. Furthermore, in such filter systems the closure member of the filter housing can be fixed to the housing main body by a simple mechanical connection, for instance a snap fit. Furthermore, the filter housing and the centrifugal pump also can be interconnected mechanically for fluid communication by a plug and socket connection. A disadvantage encountered in this type of filter system resides in that the filter system is visible.

Accordingly, it is the main object of the present invention to provide a filter of the kind referred to above, wherein the major portion of the filter housing is not visible while the liquid seal of the mechanical connection between the closure member and the housing main body is still warranted.

To this end the invention provides for a filter of the kind referred to above being characterized in that the inlet connector means and the outlet connector means are both provided on the removable closure member, in that the end portion of the housing main body removably carrying the closure member is arranged in downward facing relationship, and in that under operative conditions the support means supports the filter housing in such vertical position that the closure member just completely immerges into the water, while the major portion of the housing main body projects over the surface of the water in upward direction.

After having been filled with a filter material or after insertion of a filter cartridge the filter in accordance with the present invention is mounted on the aquarium via the support means in such manner that the closure member is just arranged below the level of the water. Thus, a gas tight seal between the closure member and the housing main body is warranted and at the same time the major portion of the filter is arranged outside the water and thus outside of the field of view.

A further considerable advantage of this arrangement resides in that servicing of the filter is greatly facilitated, since the filter may be grasped at a dry portion of the housing and can be simply removed from the support means in upward direction. This support means normally is formed by a connector tube member or a distributor tube member being in turn connected to the submersible centrifugal pump. Thereafter, the detached filter is inverted such that the closure member comes atop, the closure member is removed from the housing main body and the filter cartridge or the filter material can be simply removed and replaced.

A further advantage of a filter in accordance with the present invention resides in that the filter material gets progressively clogged in axial direction. Thus, even after long periods of operation there are still virgin portions of the filter material. The more the filter material gets clogged with dirt, the more the level of the water column contained in the filter housing raises with respect to the level of water prevailing in the aquarium. Since the parts of the filter housing are generally produced from transparent plastic material, the extent of filter material clogging and the time of filter servicing can be very easily determined visually.

A further considerable advantage of the present invention resides in that the usable volume of the aquarium is increased, since the major portion of the filter is located outside the water volume, while in the known filters referred to above the filter represents a considerable dead volume not accessible to the fish.

A preferred embodiment of the present invention is characterized in that the closure member includes two parts arranged under axial distance so as to define an annular space communicating with one of the connector means, in that the inward facing of the closure member parts comprises a plurality of circumferentially spaced ports and in that the other of the connector means extends through both closure member parts in essentially fluid tight manner.

In such a filter the entering water is confined within a small region in the vicinity of the inlet connector means. However, before entering into the filter material proper speaking the water is distributed in circumferential direction. Thus, essentially homogeneous loading of the circumferential subregions of the filter material is warranted.

A further improvement of the invention is characterized in that the two closure member parts are detachably connected via a plug and socket mechanical connection. In such a filter only the filter housing proper speaking including the housing main body and the interior closure member part must be removed for servicing purposes. The exterior closure member part carrying a suction pipe if desired and being connected to the support means may remain within the aquarium. Thus servicing is considerably facilitated.

A further improvement is characterized in that the exterior closure member part is fixedly connected to a connector tube being in turn connectable to a submersible pump and in that the exterior closure member part comprises a sealing face cooperating with a complementary sealing face formed on the housing main body.

Thus the entering water is entirely supplied via the inlet connector means and is not directly sucked from the surroundings of the filter housing. If the latter feature is desired in view of particular filtering characteristics, no tight sealing between the exterior closure member part and the housing main body is provided and a leakage path may be provided in addition.

A further improvement of the present invention is characterized in that the sealing faces provided on the housing main body and the exterior closure member part are of frusto-conical shape. In such a filter the housing main body can be particularly simply put onto the closure member part being permanently arranged within the water volume, since a self-centering effect is obtained.

A further improvement of the present invention is characterized in that the interior closure member part is connected to the housing main body via bajonet fixing means. In such a filter particular ease of access to the cavity defined by the filter housing is obtained, and positive simultaneous removal of the interior closure member part and the housing main body is warranted.

A further improvement of the invention is characterized in that the closure member comprises valve means through which the cavity defined by the housing main body and receiving the filter material is connectable to the inlet connector means. In such a filter no dirty water can flow out of the filter when the latter is removed from the aquarium for servicing purposes. Such dirty water might even drag contaminations therewith which have already been deposited in the filter material.

A further improvement of the present invention is characterized in that the valve means comprises an axially movable annular valve member and facing control ports provided in a transverse wall portion of the closure member. Such valve means are easy to produce and to mount. Furthermore, the valve means can be very easily cleaned if necessary.

A further improvement of the present invention is characterized in that the valve member is made from a material having a specific weight approximately equal to one. With such a filter the submersible centrifugal pump need not provide a noticeable portion of the feed pressure for opening the valve means. Yet the valve means properly closes, when the filter housing has been removed from the support means.

A further improvement of the present invention is characterized in that the closure member comprises an axial peripheral wall portion adapted to guide the valve member in axial direction. Thus the annular valve member is permanently aligned with the control ports associated thereto in axial direction.

A further improvement of the invention is characterized in that the peripheral wall portion of the closure member includes a plurality of nose-shaped latching members restricting axial movement of the valve member and allowing movement of the annular valve member being made from flexible material there across under elastic deformation. Thus, the valve member cannot be detached from the closure member inadvertently. Yet the valve member is easy to remove from the closure member if desired.

A further improvement of the present invention is characterized in that the valve means comprises a valve member being formed as a profiled annular piston adapted to be displaced within a cylindrical wall of the closure member in essentially fluid tight manner, in that control ports are provided in the cylindrical wall of the closure member and movable control ports are provided in a peripheral cylindrical wall of the valve member adapted to be moved into a position, wherein they are aligned with the stationary control ports formed in the cylindrical wall of the closure member, and in that a cavity defined within the piston-shaped valve member communicates with the inlet connector means while the piston area of the valve member is exposed to the water being confined within the housing main body.

In such a filter rapid closing characteristics of the valve means are obtained, since the valve member being formed as an annular piston is rapidly moved into the closing position by the weight of the water column supported thereby as soon as the filter housing is moved out of the aquarium.

A further improvement of the present invention is characterized by abutment means defining the closed position of the valve member. In such a filter the valve member is safely supported in the closing position by associated abutment means thus being capable to safely carry the water column.

A further improvement of the present invention is characterized in that the abutment means comprise hook members formed integral with the valve member and extending through openings formed in arm members connecting the cylindrical wall of the closure member to a central tubular portion forming the outlet connector means. Such a filter is particularly advantageous in that the filter housing can be easily produced and mounted. Furthermore, the valve member can be easily removed from the closure member for servicing purposes.

A further improvement of the present invention is characterized in that the valve means comprises a disk-shaped valve member including control ports adapted to be moved into and out of a position wherein they are aligned with stationary control ports formed in the closure member and in that the valve member carries a control stud cooperating with abutment members provided on the closure member. In such a filter the valve means can be positively closed even before the filter housing is removed from the support means associated thereto. Thus, in such a filter leak flows of dirty water are completely eliminated.

A further improvement of the present invention is characterized in that the disk-shaped valve member is arranged on that side of the closure member facing towards the cavity defined by the housing main body. In such a filter the valve member is positively urged against the control ports formed in the closure member. Thus, the sealing characteristics of the valve means improve proportional to the mass of water contained within the filter housing.

A further improvement of the present invention is characterized in that the inlet connector means has the same geometry as the suction connector means of a submersible pump used to circulate the water through the filter. In such a filter progressive filtering of the water may be achieved using different filter materials without affecting the usable volume of the aquarium.

A further improvement of the present invention is characterized in that it comprises a plurality of filter housings and in that the support means are formed by identical connector tube members, the first of which interconnecting suction connectore means of the submersible pump to the outlet connectore means of the closure member of the first filter housing, succeeding ones of the connector tube members interconnecting the inlet connector means of a filter housing to the outlet connector means of another filter housing. In such a filter the effective volume of filter material can be increased without affecting the usable volume of the aquarium or the size of the field of view.

A still further improvement of the present invention is characterized in that it comprises a plurality of filter housings and in that the support means comprises a distributor tube member connectable to the suction connector means of the submersible pump and including a plurality of connector means mechanically connectable to the outlet connector means of the filter housings. Also in such filter the effective volume of filter material is increased without affecting the usable volume of the aquarium or the size of the field of view.

The invention will now be explained in more detail describing preferred embodiments thereof referring to the enclosed drawings. Therein FIG. 1 shows an aquarium comprising a first filter system including a plurality of series-connected filter housings and comprising a second filter system including a plurality of parallel connected filter housings;

Figure 1:
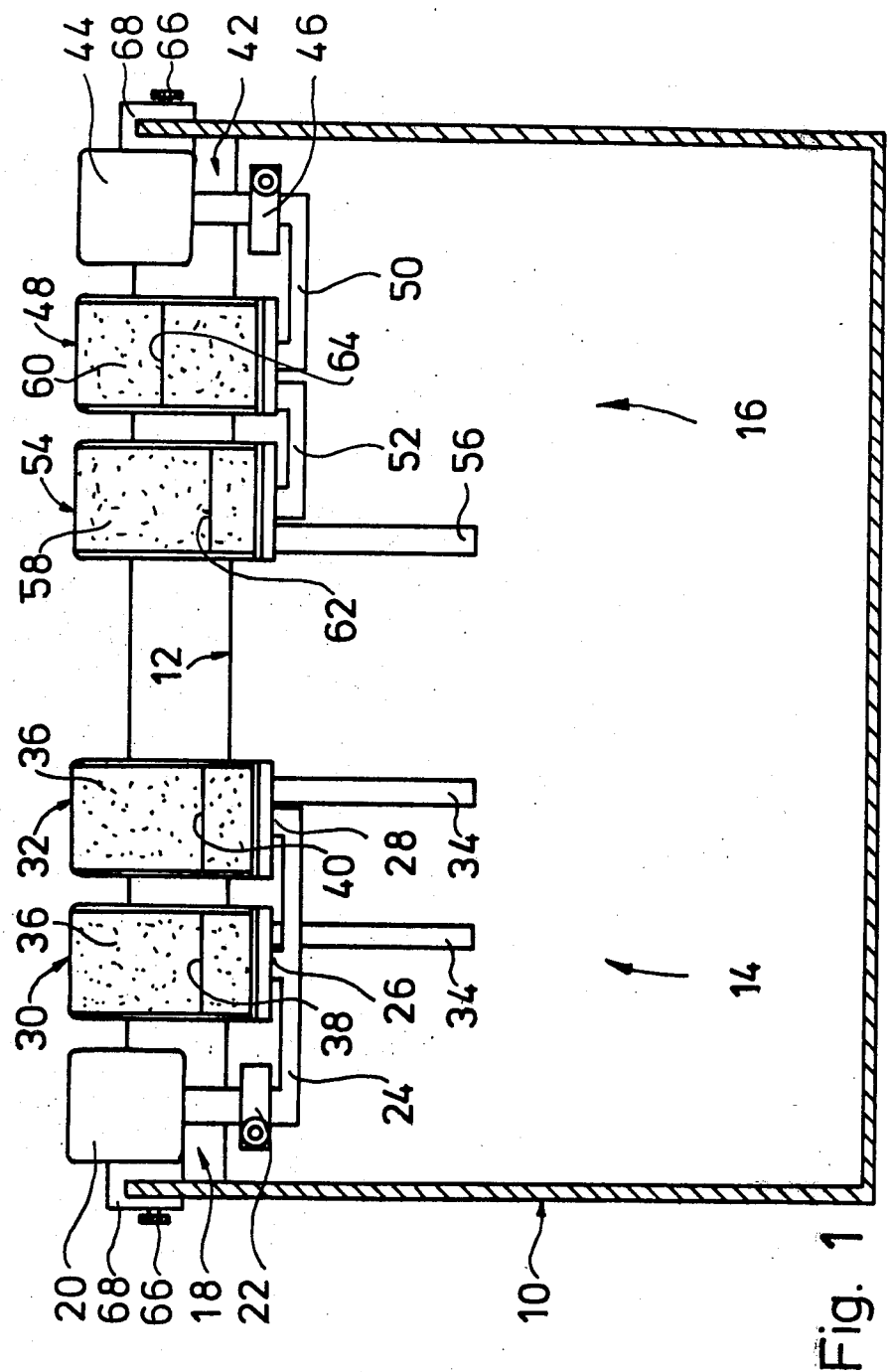

FIG. 1 shows an indoor aquarium 10 containing a mass of water, the surface of which has been designated by the reference numeral 12. For explaining purposes, the aquarium 10 is shown together with two filter systems 14 and 16. It is to be understood that a single filter system will generally be sufficient to remove undesired contaminations from the water of the aquarium.

The filter system 14 comprises a submersible centrifugal pump generally shown at 18. The pump 18 includes a motor unit 20 and a centrifugal pump 22 mechanically connected thereto. The suction port of the centrifugal pump 22 is connected to a hollow distributor tube 24 being formed with tubular connector portions 26 and 28. Filter housings 30 and 32 are removably fit into the connector portions 26 and 28. Each of the filter housings 30 and 32 carries a suction pipe 34. Filter cartridges 36 of hollow cylindrical geometry are arranged within the filter housings 30 and 32. The water enters into the filter cartridges via the lower end face thereof, and the filter water exits from the filter cartridges in radial direction via the interior peripheral surface of the cartridge, the filtered water being subsequently fed to the centrifugal pump 22.

When virgin filter cartridges 36 are inserted into the filter housings 30 and 32, the level of water prevailing in the filter housings 30 and 32 and being designated by the reference numerals 38 and 40 first is essentially aligned with the surface 12 of the mass of water of the aquarium. Thereafter a negative pressure is developped within the filter housings 30 and 32 and the levels 38 and 40 mount accordingly. The negative pressure prevailing in the filter housings 30 and 32 increases progressively proportional to the extent of clogging of the filter cartridges, since the throttling effect of the filter cartridges is correspondingly increased. When the levels 38 and 40 reach the upper end of the filter housings 30 and 32, the filter cartridges should be serviced or replaced. Submersible centrifugal pumps for use with aquariums are generally designed for use with filter housings being suspended therebelow. Thus, the feed capacity of sucn pump is sufficient to raise the levels 38 and 40 by providing a corresponding negative pressure in the housings 30 and 32 without noticeable reduction of the feed capacity.

In the filter system 14 the individual filter housings are connected in parallel as to the flow of water. Obviously, the number of filter housings can be easily increased by providing a correspondingly longer distributor tube 24, by providing a star-shaped distributor member having a large number of tubular connector portions. Thus, a filter of very large effective volume can be distributed on a plurality of filter housings which are arranged at the surface of the water and do not affect the size of the field of view. Hitherto, provision of larger volume filters always meant a considerable decrease in the field of view and in the usable volume of the aquarium.

For servicing or replacement of the filter material, the filter housings 30 and 32 are simply grasped at the portion of the housing being located above the surface 12 of the water. By applying an appropriate vertical force, the filter housings are simply drawn off from the associated connector portions 26, 28. Thereafter, the filter housings are inverted such that the closure member faces in upward direction. The closure member may then be removed and free access to the interior of the filter housing is obtained. Details of the structure of the closure member and of the mechanical connection provided between the closure member and the filter housing main body viz. the distributor tube 24 will be described in more detail below.

The filter system 16 comprises a submersible centrifugal pump 42 including a motor unit 44 and a centrifugal pump 46. The outlet of a first filter housing 48 is connected to the suction side of the centrifugal pump 46 via a hollow connector tube 50, the inlet of the filter housing 48 being connected to the outlet of a second filter housing 54 via a second hollow connector tube 52. The inlet of the second filter housing 54 communicates with a suction pipe 56. The identical connector tubes 50 and 52 provide for a series connection of two filters. The second filter housing 54 comprises a filter cartridge 58 made from cotton wool to retain particles of comparatively large diameter. The first filter housing 48 contains a filter cartridge 60 of charcoal material serving as an end filter. The level of the water prevailing in the filter housings 48 and 54 has been designated by the reference numeral 62 and 64, respectively. These levels are shown at different vertical positions. Such conditions are encountered under operative conditions due to the a priori different throttling characteristics of the filter material and due to the different extent of clogging of the filter material.

A further connector tube may be used to include a further filter housing into the filter circuit, which may include a zeolite material and would be arranged streamdown of the filter housing 48 for even finer filtering of the water.

The connector tubes 50 and 52 include connector portions having the same geometry as the connector portions 26 and 28 of the distributor tube 24. Thus, all connector portions of the fluid communicating members guiding the water between the filter housings and the centrifugal pump are identical so that even combinations of series connections and parallel connections of filter housings may be easily realized. Thus, the suction side of a submersible centrifugal pump may be connected to the outlets of two zeolite end filters using a distributor tube including three connector portions, and the inlets of the two zeolite end filters thus being connected in parallel may be connected to a common distributor tube also having three connector portions and being laterally offset. The third connector portion of this latter distributor tube may then be connected to the righthand end of the connector tube 50 shown in FIG. 1 via a cranked intermediate member. Thus a series connection including a cotton wool filter, a coal filter and a parallel circuit of two zeolite filters is obtained. By doing so, the flow rate through the different filter materials can be easily adjusted to the porosity of the filter material.

From the above description it becomes apparent that a particular filter system can be easily adjusted for use with different sorts of fish or different plants and that a given filter system can be easily expanded by simply adding further filter housings through plug and socket connections. Whatever the particular configuration of the filter system is, the field of view of the aquarium remains essentially free from filter housings and other components of the filter system.

The filter housings are mechanically carried by the distributor tube and/or the connector tubes of the system, which in turn are supported from the submersible centrifugal pumps. The latter are fixed to the wall of the aquarium using clamp members 68 having knurled clamping screws 66.

The filter housings and the distributor tubes, connector tubes and suction pipes are made from transparent plastic material. Thus, these components can be easily controlled visually as to their function and as to necessity of servicing.

Particularly referring to FIG. 2, details of the filter housings and their connection to a connector tube 50 will be explained. Mounting of a filter housing on a distributor tube is achieved in quite analogous manner.

Figure 2:
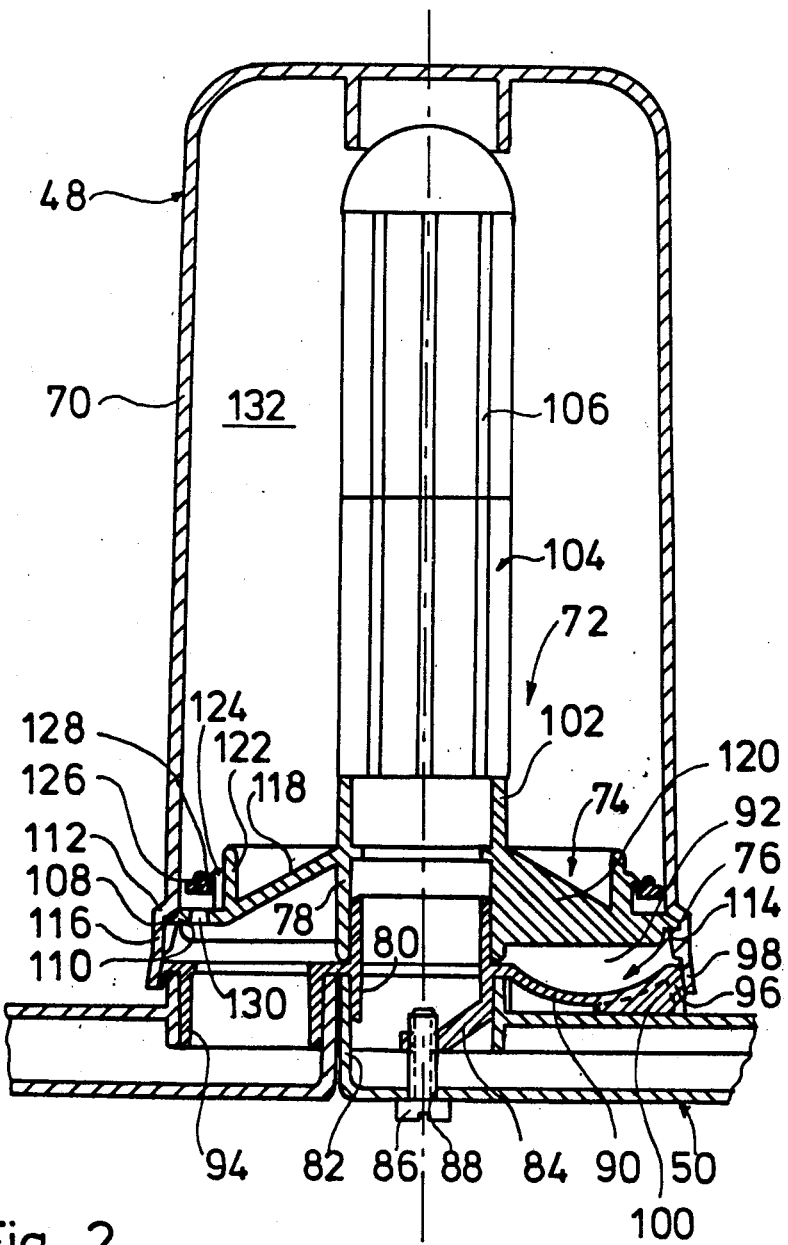
FIG. 2 shows an axial sectional view of one of the filter housings shown in FIG. 1 and of the end portion of a fluid connector member associated thereto and providing for fluid connection with a submersible centrifugal pump, the two halves of the sectional view located at either side of the central line extending in radial planes including an angle of 45°.

The filter housing 48, an axial cross-sectional view of which is shown in FIG. 2, has a cup-shaped or pot-shaped housing main body 70 and a closure member generally shown at 72. The closure member 72 includes an interior part 74 and an exterior part 76.

The interior part 74 of the closure member 72 comprises a central tubular connector portion 78, adapted to receive a tubular connector portion 80 of the exterior part 76 of the closure member 72. A tuburlar connector portion 82 of the connector tube 50 is fit onto the connector portion 80. The connector portions referred to above are formed as mechanical plug aand socket connections having a small conicity of a few degrees. Four radial arms 84 are formed integral with the exterior end of the connector portion 82. A screw 86 is supported from the hub portion formed by the crossing area of the arms 84. The screw 86 extends through an opening 88 formed in the connector tube 50. Thus, the exterior part 76 of the closure member 72 is fixed to the connector tube 50 being in turn plugged onto the suction cone of the centrifugal pump 46.

The exterior part 76 of the closure member 72 has a transverse wall 90 defining an essentially annular trough and cooperating with the interior part 74 of the closure member 72 to define an annular space 92 forming an annular inlet header space. A tubular inlet connector portion 94 of the exterior part 76 of the closure member 72 communicates with the annular space 92. Connector tube 52 is plugged onto the connector portion 94. The exterior part 76 of the closure member 72 further comprises a frustoconical peripheral wall 96 engaging into a complementary frusto-conical end portion 98 of the housing main body 70. Four radial reinforcing ribs 100 are provided to support the wall 90 from the peripheral wall 96.

The connector portion 78 is formed with an axial extension 102, and a central tube member 104 having axial slots 106 formed therein is mounted thereon. Under operative conditions the central tube member 106 faces the interior peripheral surface of a filter cartridge or of filter material contained in the cavity defined by the filter housing 48.

The interior part 74 of the closure member 72 comprises a peripheral brim portion 110 being chamfered as shown at 108. The brim portion 110 engages a complementary shoulder 112 formed on the housing main body 70. Cutouts formed in the brim portion 110 which are not shown in the drawings are adapted to be moved across nose-shaped latching members 114 formed integral with a cylindrical wall portion 116 provided at the lower end of the housing main body 70. The cutouts of the brim portion 110 and the latching members 114 cooperate in forming a bajonet-type mechanical connection for detachably mounting the interior part 74 of the closure member 72 at the lower open end of the housing main body 70.

The brim portion 110 is connected to the connector portion 78 via a frusto-conical wall 118 and four radial reinforcing ribs 120. At the lower end of the wall 118 a peripheral cylindrical wall 122 is provided. Four radially projecting nose-shaped latching members 124 are carried by the exterior surface of the wall 122. An annular valve member 126 has been moved across the latching members 124 under elastic deformation. The valve member 126 includes a shoulder 128 cooperating with the latching members 124. The flat lower end face of the valve member 126 is adapted to simultaneously overly a plurality of valve control ports 130 provided in the brim portion 110 in circumferentially spaced relationship. The cavity of the filter housing adapted to receive the filter material and designated by the reference numeral 132 is connectable to the annular space 92 via the control ports 130. The valve member 126 is made from polypropylene or a similar plastic material having a specific weight near to one. The free edge of the peripheral wall 122 simultaneously serves to axially position a filter cartridge not shown.

To insert a filter cartridge or to introduce filter material as cotton wool or peat part 74 of the closure member 72 is rotated such that the cutouts of the brim portion 110 are aligned with the latching members 114. Thereafter the part 74 of the closure member is axially removed out of the housing main body 70. Thereafter the filter cartridge or the filter material is introduced and the part 74 of the closure member is inserted into the housing main body 70 and latched by rotating thereof. The filter housing 48 is then partially immersed into the water of the aquarium being orientated as shown in FIG. 2, i.e. having the part 74 of the closure member facing in downward direction. The conical end portion 98 of the housing main body 70 is then plugged onto the conical peripheral wall 96 of the exterior part 76 of the closure member 72 being in turn fixed to the connector tube 50 by means of the screw 86. Water will now penetrate into the filter housing almost reaching the level 12. Thereafter the submersible centrifugal pump is energized and will suck water through the filter material, the flow path extending from the inlet connector portion 94 through the annular space 92, across the control ports 130, past the valve member 126, through the filter material towards the central tube member 106 and to the outlet connector portion 80. Excessive air still found in the filter housing during the starting phase will be easily dragged away by the fed water being finely divided by the filter material. Thus, a small negative pressure will rapidly be established within the filter housing.

In the course of continuous operation the filter material gets increasingly clogged, and increased throttling of the flow of water is obtained. Thus, the negative pressure prevailing in the filter housing also increases and the level of water shown at 64 in FIG. 1 continuously raises. Thus, the water reaches fresh unclogged portions of the filter material. After the level 64 has raised up to the bottom of the cup-shaped housing main body 70, the filter material viz. the filter cartridge must be replaced or purged.

To this end the submersible centrifugal pump 22 is deenergized. Thereafter, the portion of the housing main body 70 projecting above the level 12 of water is firmly grasped and the housing main body 70 together with part 74 of the closure member 72 is removed from part 76 of the closure member 72 applying a slight force and possibly additionally applying a slight rotational movement. If the valve member 126 is made from a material having a specific gravity greater than one, it will already overly the control ports 130. If the valve member 126 is made from a material of a specific gravity smaller than one, the valve member will be moved into engagement with the control port 130 due to the weight of the column of water situated above. In either case the valve member 126 is securely held in a position closing the control ports 30 due to the hydrostatic pressure exerted thereon after the filter housing has been moved out of the water in upward direction. Thus, no appreciable quantities of unfiltered water contained with the filter housing can flow back into the water of the aquarium together with contaminations already accumulating in the filter material.

Having thus removed from the aquarium the filter housing is inverted such that the part 74 of the closure member faces in upward direction. Part 74 of the closure member is then removed as has already been described above. Thereafter the filter material and the water contained within the filter housing can be easily removed from the cavity 132. If desired valve member 126 can be easily moved across the latching members 124 under elastic deformation if cleaning of part 74 of the closure member and particularly the control openings 130 is required.

Figure 3:
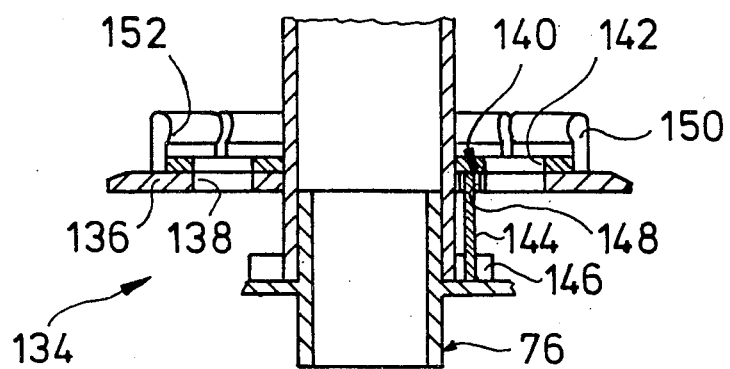
FIG. 3 shows an axial sectional view of a modified closure member for use with the filter housing main body shown in FIG. 2, the view being taken along line III—III of FIG. 4 and valve means associated to the closure member being shown in the open position.
Figure 4:
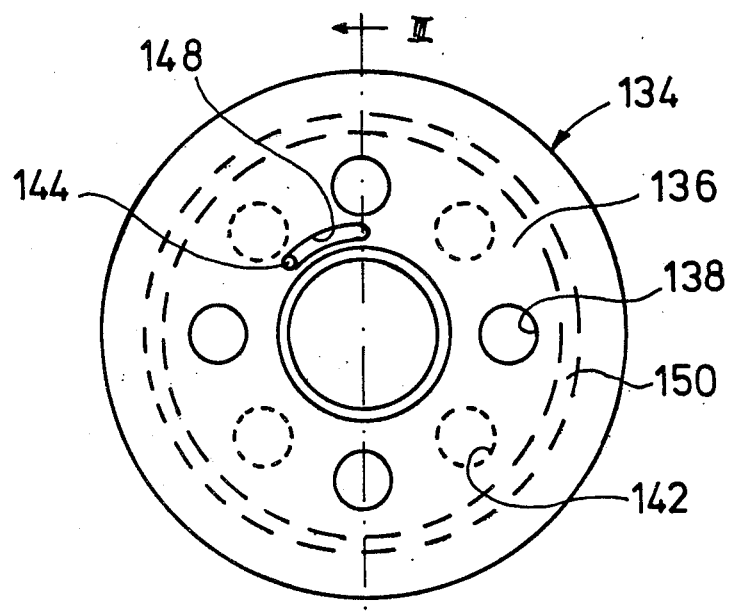
FIG. 4 shows a plan view of the closure member of FIG. 3, the valve means being shown in the closed position.

FIGS. 3 and 4 show an interior part 134 of a closure member which can be used instead of part 74. Part 134 carries a rotary valve including control ports 138 formed in a radial wall 136 of the closure member as well as a disk-shaped valve member 140 including movable control ports 142. A control stud 144 is formed integral with the valve member 140. Control stud 144 is adapted to be actuated by nose-shaped abutment members 146 carried by the exterior part 76 of the closure member. Control stud 144 extends through an arcuate slot 148 formed in the wall 136. By rotating the filter housing with respect to the exterior part 76 of the closure member the valve member 140 can be easily moved between the open position shown in FIG. 3 and the closed position in FIG. 4 et vice versa.

In order to retain the valve member 140 on the part 134 of the closure member the annular wall provided to axially position the filter cartridge is subdivided into a plurality of resilient wall segments 150 each including a radially inwardly projecting latching bead 152. By exerting an axial force the disk-shaped valve member 140 can be easily moved across the latching beads 152. If the valve member 140 must be removed for cleaning purposes such can be achieved quite easily in the closed position thereof by inserting a pencil or the like through one of the control ports 138 and exerting an upward axial force onto the valve member.

Apart from the mode of operating of the valve carried by the closure member a filter including a closure member in accordance with FIGS. 3 and 4 operates in quite the same way as has been described above. Opening or closing of the valve may be simply achieved by rotating the valve member 140 after the filter housing has already been mounted on the exterior part 76 of the closure member. The fact that the valve has been moved into the open position thereof can be easily verified by monitoring the rise of water within the transparent filter housing.

Figure 5:
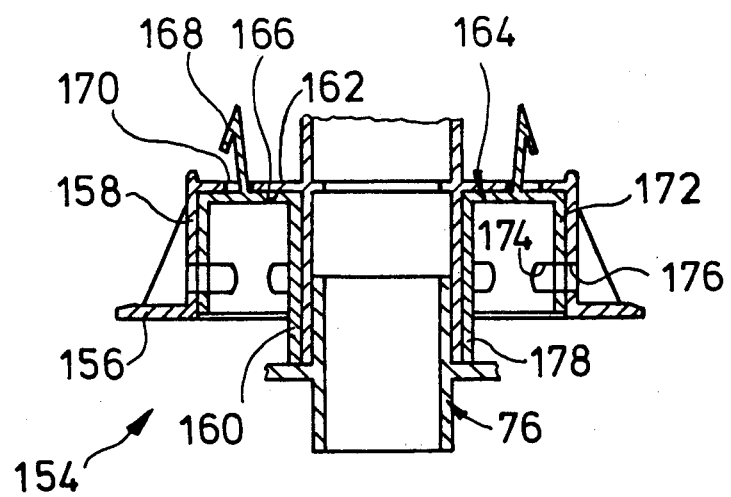
FIG. 5 shows an axial sectional view of a further modified closure member for use with the filter housing main body of FIG. 2.

FIG. 5 shows a further embodiment of an interior part 154 of the closure member having a peripheral brim portion 156, an exterior cylindrical wall 158 and a central cylindrical wall 160. Radial arms 162 are provided to interconnect the walls 158 and 160. A trough-shaped piston like valve member 164 is sandwiched between the cylindrical walls 158 and 160. An annular piston area 166 thereof communicates with the filter material receiving cavity situated above. In order to avoid that the valve member 164 drops from the part 154 of the closure member, hook members 168 are formed integral with the piston wall of the valve member 164.

The hook members 168 have been inserted through openings 170 formed in the arms 162 under elastic compression. Thus the hook members 168 simultaneously provide for circumferential positioning of the valve member 164 without affecting the axial movement thereof.

An outer cylindrical wall 172 of the valve member 164 comprises circumferentially extending control slots 174 being aligned with control slots 176 formed in the cylindrical wall 158, when the valve member 164 engages the arms 162.

An interior cylindrical wall 178 of the valve member 164 extends beyond the plane defined by the brim portion 156 such that it abuts the exterior part 76 of the closure member when the housing main body is mounted on the part 76 of the closure member. Thus in the operative condition of the filter housing the valve member 164 is positively urged into the open position whatever its angular position with respect to the radial plane containing the inlet connector portion 94 of part 76 be. If the filter housing is removed from the aquarium the valve member 164 is urged in downward direction by the weight of the water column carried thereby. Thus the continuous portion of the exterior cylindrical wall 172 becomes axially aligned with the control slots 176, the latter thus becoming closed. Thus, a filter housing including an interior part of the closure member as shown in FIG. 5 can also be removed from the aquarium for cleaning and servicing purposes without any risk of dirty water escaping from the interior of the filter housing into the water of the aquarium.

I claim:

1. A pump and filter combination for an aquarium comprising motor means for operating a pump impeller, mounting means for supporting said motor means on the sidewall of an aquarium, shaft means depending vertically beneath said motor means and constructed and arranged to rotate a pump impeller located beneath said motor means, housing means for said impeller and an outlet for liquid in said impeller housing, bracket means with a conduit located therein, said conduit being in fluid communication with the suction side of said impeller housing at one end thereof and communicating with the interior of a filter housing at the other end thereof, said filter housing comprising a base supported by said bracket and of a cup-shaped upper portion having a closed upper end that is vertically removable from said base, inlet and outlet connecting means depending from the lower side of said filter housing and being in communication with the interior thereof, filter means located in said filter housing between said inlet and outlet filter housing connecting means located on said base, whereby when a filter has become clogged to the point where servicing or replacement is necessary, change can be easily effected by merely grasping the closed upper end portion of said filter housing and easily disengage said filter housing from said bracket means.

2. A pump and filter combination according to claim 1 wherein said filter housing includes valve means that can be closed upon disengagement of said filter housing to thereby prevent unfiltered water from flowing back into the water of the aquarium.

3. A pump and filter combination according to claim 1 or 2 wherein at least a portion of said filter housing is composed of material that is transparent, whereby the degree of clogging of the filter can be readily observed.

4. A pump and filter combination as set forth in claim 2 wherein said valve means comprises an axially movable annular valve member and facing control ports provided in a transverse lower wall portion of said filter housing that serves as a closure means.

5. A pump and filter combination as set forth in claim 2 wherein said valve member is made from a material having a specific gravity approximately equal to one.

6. A pump and filter combination as set forth in claim 4 wherein said closure means comprises an axial peripheral wall portion adapted to guide said valve member in an axial direction.

7. A pump and filter combination as set forth in claim 6 wherein said peripheral wall portion of said closure means includes a plurality of nose-shaped latching members restricting axial movement of the valve member and which permit movement thereacross of said annular valve member being made of flexible material under elastic deformation.

8. A pump and filter combination according to claim 2 wherein said valve means comprises a valve member in the form of a profiled annular piston adapted to be displaced within a cylindrical wall of a closure means associated with the lower end of the filter housing in an essentially fluid tight manner, and stationary control ports are provided in the cylindrical wall of the closure means and movable control ports are provided in a peripheral cylindrical wall of the valve member adapted to be moved into a position wherein the movable control parts are aligned with the stationary control ports formed in the cylindrical wall of the closure means, and in that a cavity defined within the piston-shaped valve member communicates with the inlet connecting means while the piston area of the valve member is exposed to the water being confined within said filter housing.

9. A pump and filter combination according to claim 2 wherein abutment means define the closed position of the valve member, said abutment means comprising hook members formed integral with the valve member and extending through openings formed in arm members connecting the cylindrical wall of the closure member to a central tubular portion forming the outlet connecting means.

10. A pump and filter combination according to claim 2 wherein said valve means comprises a disk-shaped valve member including control ports adapted to be moved into and out of a position wherein they are aligned with stationary control ports formed in a closure associated with the lower end of the filter housing means and in that the valve member carries a control stud cooperating with abutment members provided on the closure means.

11. A pump and filter combination according to claim 2 wherein said disk-shaped valve member is arranged on that side of the closure means facing towards the cavity defined by said cup-shaped filter housing.

12. A pump and filter combination according to claim 1 wherein the inlet connecting means has the same geometry as the suction connecting means of the pump used to circulate the water through the filter.

13. A pump and filter combination according to claim 1 wherein there are a plurality of filter housings and the bracket means are formed by identical bracket members, the first of which interconnects said pump to the outlet connecting means of the first filter housing and succeeding bracket members interconnect the inlet connecting means of one filter housing to the outlet connecting means of another filter housing.

14. A pump and filter combination according to claim 1 wherein there are a plurality of filter housings and the bracket means therefore comprises a distributor bracket member connectable to the suction side of the impeller pump and includes a plurality of connecting means mechanically connectable to the outlet connecting means of the filter housings.

15. A pump and filter combination according to claim 1 wherein said base includes two axially spaced apart parts to thereby define an annular space communicating with one of said connecting means, and the innermost of said parts includes a plurality of circumferentially spaced apart ports and the other of said connecting means extends through both of said axially spaced apart parts in an essentially fluid tight manner.

16. A pump and filter combination according to claim 15 wherein said two axially spaced apart parts are detachably connected via a plug and socket mechanical connection.

* * * * *